No. 851,192. PATENTED APR. 23, 1907.
T. J. YOUNGLOVE.
DOOR CHECK.
APPLICATION FILED APR. 14, 1906.
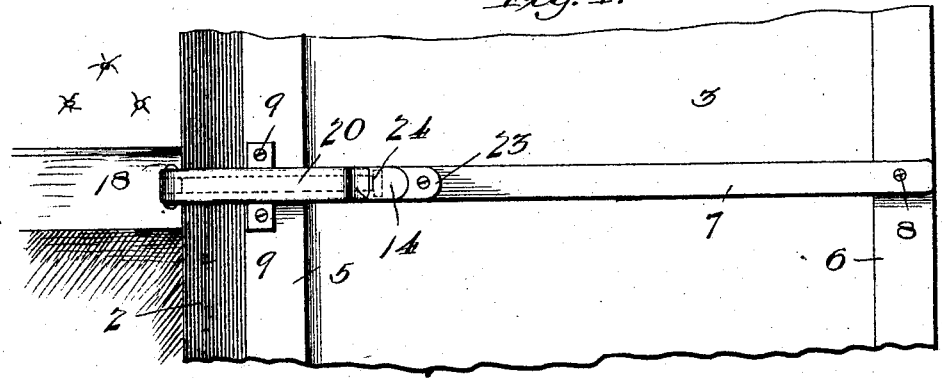
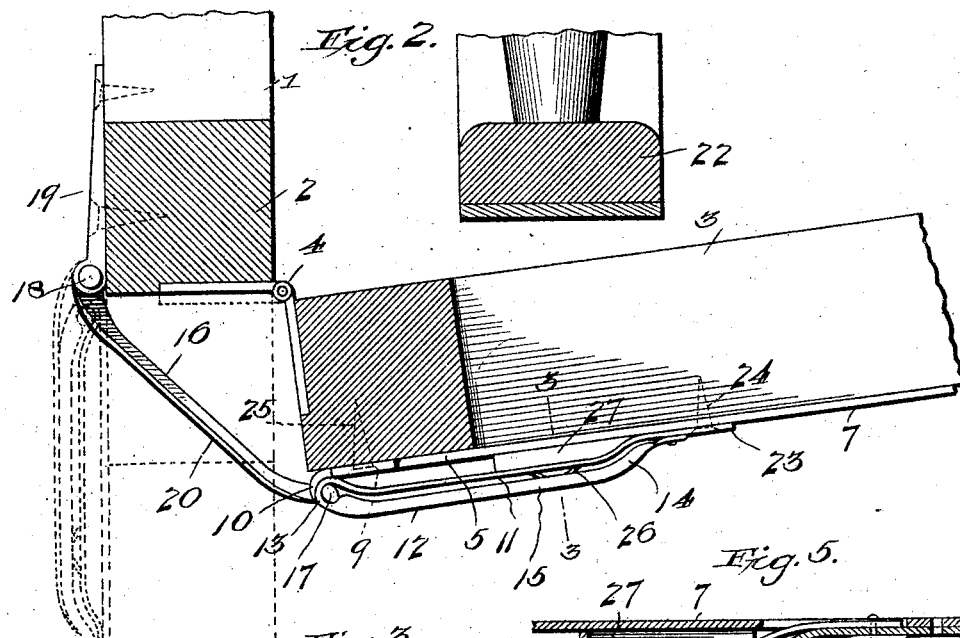
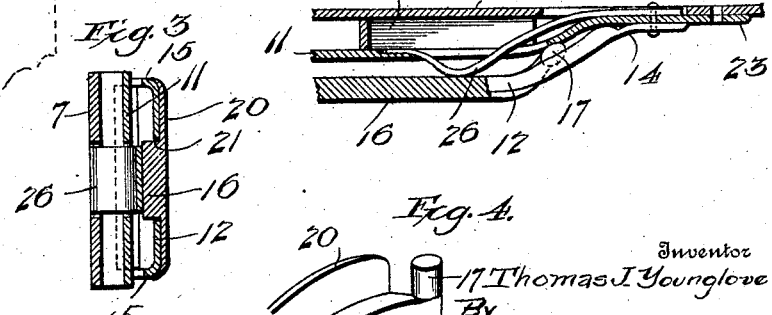
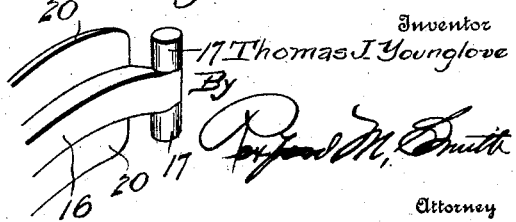
Inventor
Thomas J. Younglove
Witnesses

UNITED STATES PATENT OFFICE.

THOMAS J. YOUNGLOVE, OF RICHMOND, VIRGINIA, ASSIGNOR OF ONE-HALF TO THOMAS B. HICKS, OF RICHMOND, VIRGINIA.

DOOR-CHECK.

No. 851,192.  Specification of Letters Patent.  Patented April 23, 1907.

Application filed April 14, 1906. Serial No. 311,763.

*To all whom it may concern:*

Be it known that I, THOMAS J. YOUNGLOVE, a citizen of the United States, residing at Richmond, in the county of Henrico and State of Virginia, have invented a certain new and useful Door Check and Protector, of which the following is a specification, reference being had therein to the accompanying drawing.

This invention relates to door checks and protectors and is in the nature of a modification of the construction described and illustrated in an application filed by me dated March 29, 1906, Serial Number 308,802, the object of the invention being to provide a checking device especially designed with reference to the hinged doors of all kinds of vehicles, whereby the door itself is braced and strengthened, and prevented from coming in injurious contact with the wheel, doing away with the unsightly strap now in common use, the checking device being adapted to be concealed by the lining or upholstery at the inner side of the door.

With the above and other objects in view, the invention consists in the novel construction, combination and arrangement of parts as hereinafter fully described, illustrated and claimed.

In the accompanying drawings: Figure 1 is an inside elevation of the door of a vehicle showing the improved check applied thereto. Fig. 2 is an enlarged horizontal section through the same showing the adjacent portion of one of the wheels. Fig. 3 is a cross section on the line 3—3 of Fig. 2. Fig. 4 is a detail perspective view of one end of the link, looking toward the inner side thereof. Fig. 5 is a detail horizontal section through one end of the guide, showing the runner-engaging spring.

Referring to the drawings, 1 designates a part of the body of a vehicle and 2 the pillar or hinge post at one side of the doorway, while 3 represents the door which is hinged to the pillar 2 as shown at 4 and which comprises the inner and outer side bars or uprights 5 and 6 respectively.

The door check embodies a tie bar 7 which extends entirely across the door being secured at 8 to the outer side bar or upright 6 and provided at its inner end with a tee extension secured at the points 9 to the inner side bar or upright of the door. At its inner end the tie bar 7 is provided with oppositely arranged hooks 10 against which the guide seats itself as hereinafter particularly described.

The guide comprises the base 11 which abuts against the tie bar 7 and an outer substantially parallel portion 12 which is connected at its opposite ends to the base 11 as shown at 13 and 14, the connecting portion 13 forming a stop shoulder for the runner portion of the link hereinafter described, and the said portion 13 being seated against the hooks hereinabove referred to and as shown in Fig. 2. The opposite or top and bottom edges of the front bar 12 of the guide are bent over to form inwardly extending flanges 15 which partially close the space between the base 11 and the part 12 of the guide, said space being left partially open so that dirt, trash, etc., cannot accumulate therein.

The link 16 consists of a bar provided at one end with a runner consisting of one or more stop shoulders or projections 17 extending above and beneath the body of the link and adapted to slide within the guide and between the parts 11 and 12 thereof, and also between the flanges 15. The opposite end of the link 16 is pivotally connected by a removable soft-metal pin 18 to a hinge piece 19 secured to the inner wall of the side of the vehicle as shown in Fig. 2. Under the preferred embodiment of this invention, a face-plate 20 is secured to the outer side of the link 16, said face plate being preferably of equal width with the guide so as to cover and conceal the guide and the slot 21 in the front part 12 of the guide through which slot the link 16 is received. The face plate 20 may be given any desired ornamentation in order to add to the attractiveness of the door check, and may contain the name of the owner.

It will be seen that the door check arrests the outward swinging movement of the door before the latter comes in contact with the wheel shown at 22 or the door hinge thus preventing injury to the door and loosening the hinges. The tie strap 7 materially strengthens and stiffens the door and the check as a whole stiffens and braces the connection between the door and body of the vehicle, and assists in preventing the door from breaking away from its hinges.

The guide is provided at one end with an extension ear or portion 23 through which a fastener 24 may be inserted into the door, said fastener also passing through the tie bar 7. If desired, another fastener 25 may be inserted through the inner end portion of the guide and also through the tie bar 7 as shown in Fig. 2.

Extending outward from the base of the guide is a spring 26 which projects partially across the space between the parts 11 and 12 of the guide. This spring is arranged adjacent to that end of the runway which is occupied by the runner of the link when the door is closed. It will thus be seen that just before the door reaches its closed position, the runner is compelled to pass over said spring and depress the spring in order to get by the same. Should it happen that the door be left unlatched and start to swing open, the spring will bear against the runner and prevent the runner from moving lengthwise of the guide, thus holding the door from swinging open notwithstanding the fact that the door is unlatched.

27 designates a small housing or casing at the back of the base 11 in which the spring works.

When the door is closed, the link rests against the spring and the spring exerts an outward pressure against the link thereby holding the link from rattling against the guide.

Under the preferred embodiment of the invention, the hinge pin 18 is made movable to facilitate taking the door off the hinges and said pin is preferably composed of copper or other soft material so that it will be sheared in two when any unusual stress is brought to bear on the door to avoid completely wrecking the door. The tie bar also adds greatly to the life of the door by fastening the side bars or uprights thereof together and the device as a whole will be found greatly superior to the old, unsightly strap which is always breaking loose from its fastenings, or else splitting off portions of the door and requiring the securing screws thereof to be set further and further inward as each break occurs.

While I have described the door check as being particularly designed for use on the hinged doors of vehicles, it will be understood that said check is applicable to any hinged door, such as the doors of wardrobes, china closets, book cases, etc.

I claim:

1. A check for preventing a vehicle door from striking against the adjacent wheel, embodying a hinge piece, a guide having parallel inner and outer portions, and a link pivotally connected with the hinge piece and provided with a cross-head the projecting parts of which are movable lengthwise between the inner and outer portions of the guide.

2. A check for preventing a vehicle door from striking against the adjacent wheel, embodying a hinge piece, a guide comprising a base, parallel flanges connected with the base, and a link pivotally connected with the hinge piece and provided with a cross-head the projecting parts of which are movable lengthwise of the guide within the flanges.

3. A check for preventing a vehicle door from striking against the adjacent wheel, embodying a hinge piece, a guide, a link pivotally connected with the hinge piece and having a runner movable lengthwise of the guide, and a face plate carried by the link and adapted to cover the guide.

4. The combination with a hinged door, of a door check embodying a hinge piece, a guide comprising a base, and a slotted parallel portion running parallel with the base, a link pivotally connected with the hinge piece and provided with a runner movable lengthwise of the guide between the parallel portions thereof, and a face plate carried by the link and adapted to cover the slotted portion of the guide.

5. A check for preventing a vehicle door from striking against the adjacent wheel, embodying a tie-bar connecting the outer and inner uprights or side bars of the door and having one or more hooks at the inner end thereof, a guide secured to the tie-bar adjacent to the hinged edge of the door with one end seated against the hook, a hinge piece, and a link pivotally connected with the hinge piece and provided with a runner movable lengthwise of the guide, the latter being provided with a stop shoulder for the link, substantially as described.

In testimony whereof I affix my signature in presence of two witnesses.

THOMAS J. YOUNGLOVE.

Witnesses:
J. W. MACE,
CHAS. I. PHILIP.